United States Patent
Armbruster

(10) Patent No.: US 8,470,228 B2
(45) Date of Patent: Jun. 25, 2013

(54) METHOD AND A DEVICE FOR INJECTION MOULDING AND ASSEMBLING PLASTIC PARTS

(75) Inventor: Rainer Armbruster, Wolfach (DE)

(73) Assignee: Foboha GmbH Formenbau (DE)

( * ) Notice: Subject to any disclaimer, the term of this patent is extended or adjusted under 35 U.S.C. 154(b) by 581 days.

(21) Appl. No.: 12/685,555

(22) Filed: Jan. 11, 2010

(65) Prior Publication Data

US 2010/0171237 A1   Jul. 8, 2010

Related U.S. Application Data

(62) Division of application No. 10/569,774, filed as application No. PCT/EP2005/050604 on Feb. 10, 2005, now Pat. No. 7,670,125.

(30) Foreign Application Priority Data

| Feb. 10, 2004 | (CH) | 191/04 |
| Sep. 30, 2004 | (CH) | 1598/04 |
| Oct. 19, 2004 | (CH) | 1717/04 |

(51) Int. Cl.
  *B29C 45/16* (2006.01)
(52) U.S. Cl.
  USPC ............................ 264/255; 264/263
(58) Field of Classification Search
  USPC .............. 264/238, 555, 241, 248, 249, 250, 264/255, 263
  See application file for complete search history.

(56) References Cited

U.S. PATENT DOCUMENTS

| 4,295,814 | A | 10/1981 | Rosenberg |
| 4,330,257 | A | 5/1982 | Rees et al. |
| 4,744,741 | A | 5/1988 | Glover et al. |
| 5,773,049 | A | 6/1998 | Kashiwa et al. |
| 5,915,760 | A | 6/1999 | Kawase et al. |
| 6,139,305 | A | 10/2000 | Nesch ......................... 425/130 |
| 6,206,681 | B1 | 3/2001 | Kawase et al. |
| 6,558,149 | B1 | 5/2003 | Bodmer et al. |
| 7,081,179 | B2 | 7/2006 | Hartlmeier et al. |
| 7,081,222 | B2 | 7/2006 | Gram |
| 2003/0094732 | A1 | 5/2003 | Payette et al. |
| 2003/0175375 | A1 | 9/2003 | Bodmer et al. ............... 425/155 |
| 2004/0119205 | A1 | 6/2004 | Eichhorn et al. |

FOREIGN PATENT DOCUMENTS

| DE | 4123690 | 2/1997 |
| EP | 0 895 848 | 2/1999 |
| EP | 0920979 | 6/1999 |
| EP | 1060868 | 12/2000 |
| EP | 1 110 449 | 6/2001 |

(Continued)

OTHER PUBLICATIONS

European Search Report dated Apr. 24, 2012.

*Primary Examiner* — Jill Heitbrink
(74) *Attorney, Agent, or Firm* — Ostrolenk Faber LLP

(57) ABSTRACT

The invention concerns a device for injection molding (1) comprising a first fixed half-mold (3) and a second half-mold (5) mobile in direction (y) of the side blocks (4) of an injection molding machine (2). Between the first and the second half-molds are mounted first and second immediate elements (6, 7) mobile in the direction of the side blocks (4). The first and the second intermediate elements (6, 7) comprise each a mold support (12, 13) pivoting relative to a base (14, 15, 31, 32) about a pivoting axis (8, 9). Centering elements (26, 27) upon the opening and closure of the injection molding devices (1).

6 Claims, 6 Drawing Sheets

| | FOREIGN PATENT DOCUMENTS | | | JP | 63135214 | 6/1988 |
|----|----|----|----|----|----|----|
| EP | 1 155 808 | 5/2002 | | WO | WO 02/36319 | 5/2002 |
| JP | 53046356 | 4/1978 | | WO | WO03/097327 | 11/2003 |

METHOD AND A DEVICE FOR INJECTION MOULDING AND ASSEMBLING PLASTIC PARTS

CROSS-REFERENCE TO RELATED APPLICATIONS

The present application is a divisional under 37 C.F.R. §1.53(b) of prior application Ser. No. 10/569,774, filed Apr. 21, 2006 now U.S. Pat. No. 7,670,125, by Rainer Armbruster entitled DEVICE FOR INJECTION MOULDING AND ASSEMBLING PLASTIC PARTS, which is a 35 U.S.C. §371 national phase conversion of International Patent Application No. PCT/EP2005/050604 filed Feb. 10, 2005 which claims benefit and priority from Switzerland Patent Application No. 1717/04 filed Oct. 19, 2004; Switzerland Patent Application No. 1598/04 filed Sep. 30, 2004; Switzerland Patent Application No. 191/04 filed Feb. 10, 2004, of which the entire contents of each are hereby incorporated by reference.

BACKGROUND

1. Field of the Disclosure

The invention relates to a device for manufacturing plastic parts, in particular plastic parts consisting of several individual parts, according to the preamble of the independent patent claims.

2. Related Art

Devices are known form the state of the art, which are suitable for manufacturing parts which consist of one or more plastic components.

The European patent EP 1 155802 of the same applicant shows an injection moulding device with two production planes (parting planes) with a rotary system which is arranged between a stationary and a moving mould part, and serves for holding a middle mould part. The middle mould part is held by a lower and an upper crossmember by way of holding means and is movably arranged about a vertical axis. The cross-members arc guided on the tic-bars of an injection moulding machine. In order to compensate, the weight of the middle mould part, the lower crossmember, when required, is supported on the machine bed of the injection moulding machine. The holding means are arranged displaceable relative to one another, so that the middle mould part may be exchanged. In a first production plane, a first material component is injected into a cavity so that a first part arises. The part of the first material component remains sticking to the middle mould part on opening the mould, and is brought with this into the second production plane by rotating the middle mould part, where, after the closure of the mould, it is actively connected to a second material component The middle mould part is supported on the tie-bars of an injection moulding machine by way of holding devices.

EP089S848 from Ferromatik Milacron Maschinenbau GmbH shows a further device with two parting planes. A middle mould part is arranged between a stationary and a movably arranged mould part, and this middle, mould part is mounted in a lower and an upper crossmember, and is supported on a machine bed of an injection moulding device. The middle part is rotatably arranged about a vertical axis by 180° and comprises cavities only on two sides. The bearing in the region of the upper crossmember may be opened, so that the middle part may be removed.

EP 1110449 (hereinafter EP'449) of Krauss Maffei Kunststofftechnik GmbH shows an injection moulding device with two production planes, with a stationary and a movable mould half A mould middle part is arranged between the two mould halves, and is held on one side by way of a guide admitted in the machine bed of an injection moulding machine, and is rotatably arranged about an axis. The injection moulding machine is adapted to meet these special demands. The device described in EP'449 is suitable for manufacturing parts of several plastic components.

In PCT/DKOI/0699 (hereinafter PCT699), of Jes Gram, the basic concept for a method with which an assembly of two identical parts is effected by welding these to one another in at least one parting plane is described. The device suggested for implementing the method comprises two middle parts which in each case are rotatably arranged about an axis, and which may be opened and closed with the injection mould. PCT699 generally describes a device for manufacturing a single hollow body, in that a first half shell is manufactured in a first injection moulding plane, and a second half shell in a second injection moulding plane, and then by way of rotating the middle parts about their axes by 180° and subsequent closure of the injection mould with a uniformly opened mould, i.e. both parting planes are opened symmetrically, are connected to one another with a material fit. The material-fit connection between the two half-shells is effected by way of joining the melted base material as a result of the closure movement of the mould. A heat source is applied for the melting, which is placed laterally next to the device. A single hollow body arises per cycle. In particular, one may not deduce from PCT699 how the middle parts have to be mounted in the injection mould, so that a perfect functioning may be ensured. The device suggested in PCT'699 for implementing the method provides no answers to questions which arc essential for carrying out the method_ The man skilled in the art has no hint from PCT'699, amongst other things also on account of the very schematic, imprecise description, as to how a device for successfully implementing the method should look in detail.

U.S. Pat. No. 4,744,741 (hereinafter U.S. 741), John B. Glover et at, shows a device with a stationary first mould half and a second mould half which is movably arranged with respect to this. A first and a second, middle part in each case rotatable about an axis are arranged between these two mould halves, and these middle parts cooperate in the middle with a direct positive fit and form the inner part of a cavity. A further mould part consisting of two mould halves in the closed condition is arranged about the rotatable middle parts and temporarily forms an outer annular part of an injection mould. In the middle, the two rotatable middle parts cooperate directly along a middle parting plane. Two first parts are manufactured simultaneously in a first and third parting plane. The device is subsequently opened in a uniform manner and the two first parts, by way of the rotatable middle parts, are joined together with a second part which is held by the middle, annular mould part. According to the description, the two first parts arc still in the part-plastic condition when they are connected to the first part, so that the first and the second part stick to one another. An external heating is provided in the case that the material is no longer sufficiently fluid, in order to melt the material again. The device described in U.S.'741 serves for manufacturing tube unions or tube connection pieces which arc to be pushed over the ends of tubes to be connected, and comprise seals which are manufactured in the same device and arc connected to the outer part in the above described way and manner by way of the rotatable middle parts. The exact construction of the injection mould described in U.S.'741 as well as their coordination may not be deduced from the document Amongst other thing, one may not deduce from the description as to what the demands on an injection moulding machine are.

A significant disadvantage of the devices known from the state of the art lies in the fact that parts are joined together via the main tool movement by way of the closing of the mould. This leads to a low precision and a slowing of the process, since the closure mechanism of the injection moulding machine which is responsible for the closure movement is not suitable for assembly. Furthermore, with a device with a multitude of cavities per closure plane, it is not possible to assemble in an individual manner.

SUMMARY

It is the object of the invention to specify a method and a device for the manufacture of complex parts, in particular assembly injection moulding products of several parts, which avoid the disadvantages of the state of the art.

One aim of the invention is based on the implementation of an injection moulding method with which two or more equal or different parts of the same or different material components are actively connected to one another in a direct manner or indirect manner. With a preferred embodiment, the individual parts preferably in the region of a first and a second parting plane of an injection moulding device according to the invention are manufactured with several mould halves, and are actively connected to one another in the region of the third parting plane of the same injection moulding device, preferably whilst utilizing the closure force, or closure movement of the injection moulding device. When required, it is envisaged as a rule for further parts to be injection moulded in the first and in the second parting plane during the active connection in the region of the third parting plane.

Alternatively or to supplement this, the active connection of at least two parts by way of a separate active connection means which preferably in the region of cavities is integrated into at least one of the mould halves or mould carriers, and as a rule steps into action with a closed injection moulding device, i.e. when the parting planes of the injection moulding device are closed or with a closing injection moulding device. In a preferred embodiment, a slide is arranged in the region of the cavities, which is designed such that generally with a closed injection moulding device, it may bring a first part into active connection with a second one by way of a relative movement. One advantage of this active connection means lies in the fact that the injection moulding device may be closed independently of the active connection of the at least two parts, and the active connection is decoupled from the closure movement of the injection moulding device. A possibility of improving the adaptation or of adjustment (path and/or speed and/or force) of the procedure arises due to this, without disadvantageously affecting the machine cycle. Depending on the field of application, it would otherwise be necessary to reduce the operating speed since otherwise an optimal joining-together of the parts to be actively connected would not be ensured, or the parts would get damaged. Accordingly only a reduced production speed would be possible without the active connection mechanism according to the invention. The active connection mechanism is preferably operated in a hydraulic or electrical manner and when required comprises sensors which monitor the procedure. The active connection mechanism when required is designed such that an assembly is possible which takes account of the cavities, i.e. is matched to each or a group of cavities.

The device for carrying out the method according to the invention is preferably designed such that it may be applied together with commercially available, standardized injection moulding machines. The injection moulding device is therefore designed such that it finds space between tie-bars of an injection moulding machine. The moving parts of the injection moulding device are preferably mounted or supported opposite the tie-bars of the injection moulding machine, or the machine bed. The movement of the moving parts of the injection moulding device is at least matched to the movement of the injection moulding device by way of at least one coordination mechanism. Preferred is a coordination mechanism which matches the travelled paths of the moved parts to one another, depending on the parting planes such that the middle parts are rotated efficiently and when required simultaneously.

With a further preferred embodiment of a device according to the invention, the individual parts are preferably manufactured and/or connected to one another in the region of four parting planes. It is envisaged for further parts to be injection moulded as a rule during the active connection. An active connection mechanism guarantees the efficient assembly.

A preferred form of the active connection is effected by peripherally injecting the first and the second part. For this purpose, plastic molten is introduced into cavities in the region of the third parting plane by way of a plastification unit which as a rule is arranged laterally or above the injection moulding device, so the at least one first and the at least one second part are actively connected. The additional cavities which are required for the peripheral injection, in the region of the third, middle parting plane, are for example formed by way of retracting a core, or by way of specially configured concave mould halves which cooperate with corresponding, convexly configured counter-sides in the region of the first and second parting plane.

A device suitable for carrying out the method comprises a first, stationarily arranged mould half and a second mould half which is movably arranged with respect to the first one along guide means (tie-bars, guide rails). At least two middle parts which are each rotatable about a rotation axis are arranged between the first and the second mould half. The rotation axes of the two preferably prismatically designed middle parts as a rule are aligned parallel or at a 90° angle to one another. The middle parts are guided along guide means. The tie-bars of the injection moulding machine or other guide means, which e.g. are actively connected to a machine bed of an injection moulding machine, serve for the linear guiding of the middle parts, depending on the field of application. With a further embodiment, cantilever-like elements are attached in the region of the outer two mould halves and/or the machine plates, and serve for holding and mounting the middle parts. The middle parts are arranged rotatable about an axis standing perpendicular to the main movement direction of the injection moulding machine, and in a displaceable manner parallel thereto, so that they may be rotated about their axis given an opened injection moulding device. The middle parts may be arranged in a suspended or horizontally projecting manner, according to the field of application. As a rule, the middle parts comprise an even number of corresponding side surfaces which are arranged parallel to one another in pairs.

In the region of the third parting plane, the parts from the first and the parts from the second parting plane are preferably releasably or unreleasably actively connected to one another by way of a friction connection, snap-connection, press connection, by way of peripheral injection with the same or with a further plastic component, ultrasonic welding or frictional welding. The active connection is effected via an active connection mechanism of the initially described type, depending on the field of application.

With one device, one or more further mould parts may be provided between two middle parts, and these mould parts in combination with the middle parts rotatable about an axis serve for forming one or more cavities. The mould part is designed of one piece or of several pieces, such that the actively connected parts may be removed. The mould halves and/or the middle parts when required comprise a slide which ensures a better removal ability of the manufactured parts from the mould. The kinematics of the parts moving towards one another are matched to the additional element, or take this into account.

The method described in PGT699 may not be realized with conventional injection moulds. For this reason injection moulds which take the special requirements into account are needed. In contrast to the conventional injection moulds, the injection moulding devices suitable for carrying out the method comprises significantly more moving parts, which must be brought into a precise coordination with one another, so that the opening and closure of the injection moulding device is guarantee without collision.

The injection moulding device according to the invention is suitable for the manufacture and assembly of multi-part plastic parts. With this, plastic parts are manufactured by injection moulding in the region of at least two parting planes, and assembled or actively connected in the region of at least one further parting plane. Alternatively or supplementarily, the parts are processed and/or assembled and/or removed outside in the region of the free side surfaces of the middle parts.

The invention amongst others is suitable for the manufacture of closures for drinks packages. For example multi-part "push-pull" closures with a base and with a cap which is arranged displaceable with respect to the base, may be manufactured and assembled in an injection moulding device. Thereby, the individual parts may in each case individually consist of one or more material components. The assembly is effected either via the closure movement of the injection moulding device or via a separate active connection device which actively connects the parts after the injection moulding device is closed. With regard to the separate active connection device, it is for example the case of at least one hydraulically actuated slide arranged in the region of the cavities, by way of which the parts execute a relative movement towards one another and are thus assembled.

The possibility exists for example of manufacturing medical syringes or similar parts, by way of manufacturing an outer part in a first parting plane, and a plunger with a seal consisting of one or more material components in the second parting plane. After opening the injection moulding device and the subsequent rotating of the first and the second, middle part, the plunger is inserted into the outer part on closure of the injection moulding device. One succeeds in preventing any germs from occurring due to the high temperature. Alternatively, there exists the possibility of including a fourth parting plane in the production and carrying out the assembly externally.

The middle parts of the injection moulding device are preferably configured in a parallelepiped manner and comprise four side surfaces, of which in each case two are arranged parallel to one another. The middle parts as a rule are rotated by 90° or 180° with each operating step, so that parts manufactured in the region of the first or the second parting plane, after one or two working steps, get from the first or the second parting plane respectively into the region of the third parting plane, where they are brought into active connection with one another. When required, further processing steps, which e.g. are carried out by handling robots are provided in the stations between the parting planes, the so-called intermediate or free stations. If desired, there exists the possibility of providing free cavities, or parts sticking to the middle part, with labels which are connected to new or existing parts with the next injection procedure. The intermediate stations when required are used for cooling manufactured parts. The middle parts are preferably endlessly rotatable about an axis with respect to the stationary parts of the injection moulding device. The supply of the middle parts rotatably arranged about an axis with media such as water, air, oil and/or electricity, as well as sensor signals and command (control) variables is preferably effected coaxially via a lower and/or upper holding device. The holding devices for this purpose are designed such that they permit a coaxial leading of medium.

Parts which are manufactured or assembled in the parting planes are preferably moved by way of the middle parts between the individual stations. For this purpose, the middle parts comprise active or passive holding means. The middle parts as a rule comprise separate feeds for energy, information and operating material such as current, water, hydraulic oil and air. The energy and media are preferably led through the rotation shafts of the middle parts, so that these may be infinitely rotated about their axes.

The device described in PCT699 has the disadvantage that no centring of the mould halves and/or the middle parts to one another is provided on opening and on closing the injection mould. As has been shown, in practice it is however impossible, in particular with larger injection moulds, to position the components of the injection mould which mostly weigh tons, in such a precise manner that they are always harmonized to one another on closure of the mould. The result of this is that the high-precision and sensitive cavities may be damaged, so that a perfect functioning of the injection mould may no longer be insured.

On opening and closing an injection moulding device according to the invention, the centring and alignment of the mould halves and the middle parts to one another represents a difficulty which must be overcome at all events. Since with regard to the components of the injection moulding procedure, it is usually the case of metal blocks weighing tonnes which are opened and closed at a considerable speed, a centring of the mould may not be effected via the cavities alone. Centring means are known from the state of the art, which are used for centring conventional injection moulds with only one parting plane. Thereby, it is generally the case of case of lugs which are attached in a projecting manner at one side either on the stationary or the travelling mould half, and engage into openings in the other mould half which are envisaged for this. Since conventional injection moulds with only one parting plane as a rule are only moved in one direction, the arrangement of the centring means as a rule does not represent any problem. However, with injection moulding devices with two rotatable middle parts, an exact positioning of the mould halves is only possible if the centring means have a special arrangement and design, which ensures an exact pre-centring and centring of the movable mould parts. If required, one device according to the invention has a two-stage centring with a prior pre-centring and a subsequent or superimposed fine centring. The mould parts are captured by way of the pm-centring and subsequently brought into a precise alignment against one another by way of the fine centring.

In contrast to conventional injection moulds, the arrangement of the centring means needs to meet special demands, so that the injection moulding device may be closed at all. The arrangements of centring means known from the state of the art are not suitable for this, since a closure of the mould would not be possible. The centring means need to be arranged such that the mould halves and the two middle parts may be closed in the different positions which are envisaged for this. With the use of centring lugs, this means that e.g. the first, stationary mould half comprises four projecting centring lugs in the region of the four corners, which correspond with four centring sockets which are attached on the corresponding side surfaces of the first mould middle part. The second mould middle part on the corresponding side surfaces in turn comprises four projecting centring lugs which may be actively connected to corresponding centring sockets of the first middle part and of the second movably arranged mould half on closure of the injection moulding device. The centring lugs and centring sockets are designed such that they effect a capture and pre-centring of the moving parts, so that these in the case of a certain faulty position on closure, come to lie in the correct end position, without the sensitive cavities becoming damaged. The centring lugs and the centring sockets when required have a certain conicity at least in regions, which encourages the mutual alignment. For this reason, the centring means are preferably designed such that they ensure a centring of the mould before this is completely closed, or the sensitive regions of the cavities are actively connected to one another. Alternatively or supplementarily, the middle parts comprise further centring means which are suitable for locking the rotational movement of the middle parts about their rotation axis in positions envisaged for this. With regard to the further centring means, it is usually the case of locking pins which engage into locking openings which are envisaged for this, and thus prevent a further rotation of the middle parts after reaching a defined end position. The locking pins are preferably hydraulically or electrically operated and comprise a locking mechanism. With a parallelepiped middle part, the locking openings into which the locking pin or pins provided for this engage, as a rule are arranged at a 90°- or 180°-angle, so that the middle part may be fixed at a 90°- or 180° angle_ The further centring means serve for fixing the middle parts on reaching an end position, so that main centring means; e.g. in the form of centring lugs, may perform the fine centring.

The mountings of the middle parts and, if provided, of the further mould halves must meet particular demands, so that the injection moulding device as a rule may be simply inserted and removed between the tie-bars of an injection moulding machine. The mounting further has the advantage that it is suitable for application with conventional injection moulding machines and injection moulding devices with one or two middle parts.

A preferred embodiment of a mounting comprises a lower support which directly or indirectly actively connected to the machine bed of the injection moulding machine, is supported on this and or is guided along this. An upper support is effected by way of a crossmember which is actively connected to one or two tie-bars of the injection moulding machine and is guided along this. The crossmember and/or the lower support if required comprises a locking means which serves for locking the rotatable mould carrier in positions envisaged for this. The mounting is designed such that the middle parts are displaceable in the direction of the tie-bars of the injection moulding machine. In the lower region, the support is for example effected by way of rails which are supported on the machine bed of the injection moulding machine. In the upper region, the crossmember is actively connected to the tie-bars via linear bearings. The linear bearings as a rule are designed such that they may be released from the tie-bars in a simple manner, for example preferably in that the bearing shells are capable of being parted in the vertical direction. One of the advantages lies in the fact that the mounting in the lower region has a slim design which permits a simple and time-saving removal between the tie-bars. By way of the guiding on both sides, it is ensured that the elements of the injection moulding machine are guided with a high precision. Furthermore, there exists the possibility of providing the middle parts at the bottom as well as at the top, with a drive or with a coordination mechanism.

The coordination of the components of an injection moulding device according to the invention with a stationary first and a moving second mould halt; between which a first and a second, middle part rotatable about their axes are consecutively arranged, is preferably effected by way of a coordination mechanism. One preferred embodiment of a coordination mechanism comprises three threaded spindles which are arranged essentially parallel to one another and which actively connect the components of the injection moulding device to one another. The coordination mechanism comprises a first spindle which actively connects the first, stationary mould half to the second, travelling mould half The spindle is divided into two and comprises a first half with a positive pitch and a second half with a negative pitch running counter to the first one. The spindle is actively connected to the mould halves via stationary spindle nuts, or axial bearings, attached on the mould halves. If then, the injection moulding machine is opened or closed, the first spindle rotates about its longitudinal axis. As a result of the oppositely directed spindle pitch of the first and second part of the spindle, the spindle middle of the first spindle is always located in the middle between the first stationary and the second travelling mould half. Alternatively, the possibility exists of fixedly arranging the spindle via a suitable support, and instead to rotatably arrange the spindle nuts. A spindle block on which a second and a third spindle divided into two are supported, is located in the region of the middle of the first spindle, wherein the second spindle actively connects the spindle block to the stationary mould half, and the third spindle actively connects the spindle block to the moving mould half. The second and the third spindle are arranged such that the middle of the second spindle is moved with half the speed of the first spindle, and the middle of the third spindle is moved with 1.5 times the speed of the middle of the first spindle. With reference to the speed of the moving second mould half, the middle of the second spindle moves with a quarter of the speed of the moving mould half, and the middle of the third spindle with three quarters the speed of the moving mould half. The middles of the third and second spindle are actively connected to the first and second, middle part of the injection mould and coordinate its movement with regard to the stationary and the moving mould half The effect of the described coordination mechanism is that when opening the injection moulding device, the distance between the two middle parts is always double as large as the distance between the stationary mould half and the first or the second, middle part and the travelling mould half With this, one takes into account the fact that more space is demanded between the middle parts on rotating the middle parts about their axes than in the first and the last parting plane.

The ling drive or the coordination of the moving parts in the y-direction is effected by way of an active or passive spindle drive on one or two sides, by way of a coordinated rack drive, or actively, by way of a coordinated hydraulic drive, i.e. via hydraulic cylinder. When required or alternatively, a rack may be integrated into the rail system. An active drive system is to be understood as a drive which has its own energy supply and permits an automatic movement of the moving parts. A passive drive system is to be understood as a drive which is directly or indirectly connected to the main drive of the injection moulding machine. A preferred embodiment of a passive drive comprises coordinated spindles.

A further embodiment of a coordination mechanism comprises six racks which are coordinated in pairs in three groups. In each case, two racks are directly or indirectly connected to one another via a pinion which for example is rotatably supported on one of the crossmembers. The racks which are allocated to one another in pairs and arc arranged essentially parallel to one another carry out a relative movement to one another on opening and closure, and are actively connected to one another via at least one toothed wheel which engages into at least one of the two racks. One preferred embodiment is designed such that the pivot of the coordinating toothed wheel moves roughly with half the relative speed. The division ratios of the speed and thus the travelled path is utilized for the positioning of the inner components such as e.g. the middle parts, which are arranged between the outer components. Other division rations may be achieved by way of several toothed wheels with a different diameter, which are actively connected to one another e.g. via a pivot. The advantages of the spindle drive lie in the simple construction and in the use of standardized components.

A further embodiment of a coordination mechanism comprises hydraulic cylinders which arc actively connected to one another. By way of a suitable choice of the diameter of the cylinder or the exchanged oil volume, one succeeds in moving the parts lying therebetween with the desired speed. Hydraulic coordination mechanisms arc either driven in an active manner via a hydraulic pump or passively via driving hydraulic cylinders. An active monitoring of the position of the middle parts is provided if required, in order to avoid incorrect positioning.

A method for manufacturing a multi-part product in an injection moulding device according to the invention disclosed here, is described hereinafter in a simplified manner.

In a first method step, at least one first and a second part are manufactured essentially simultaneously in the first and the third outer parting plane with. a closed injection moulding device by way of injecting liquid plastic into cavities allocated to one another. During this, at least one first and a second part are actively connected by way of at least one active connection means essentially simultaneously in the region of the second parting plane. The injection moulding device is subsequently opened along the parting planes, and the two mould carriers are in each case rotated about their rotation axis about an angle of 90° or 180°. Thereby, the parts which have just been manufactured in the first and third parting plane remain sticking to the mould carriers and are co-moved with these. The parts which are actively connected in the middle parting plane are moved by way of one of the mould carriers about an angle of 90°, and in this position are removed or ejected by way of separate ejectors, and collected below the injection moulding device. The injection moulding device is subsequently closed afresh and the process begins once again. In a preferred variant, on opening, the second, middle parting plane is opened roughly double as far as the first and third parting plane_ This permits a more efficient, time-saving rotation. The active connection of the two first parts in the second, middle parting plane is preferably effected independently of the movement of the injection moulding machine. The active connection of the two first parts in the second, middle parting plane is effected in groups of cavities allocated to one another independently of one another, depending on the field of application.

Preferably, one electric or hydraulic motor which is directly or indirectly actively connected to the middle parts is used per middle part as a drive for the rotation of the generally parallelepiped upper parts of the middle parts about their rotation axes.

BRIEF DESCRIPTION OF THE DRAWINGS

Embodiments of the invention are hereinafter explained in more detail by way of the subsequent figures. Shown schematically and greatly simplified are in.

DETAILED DESCRIPTION OF THE EMBODIMENTS

Figure 1:
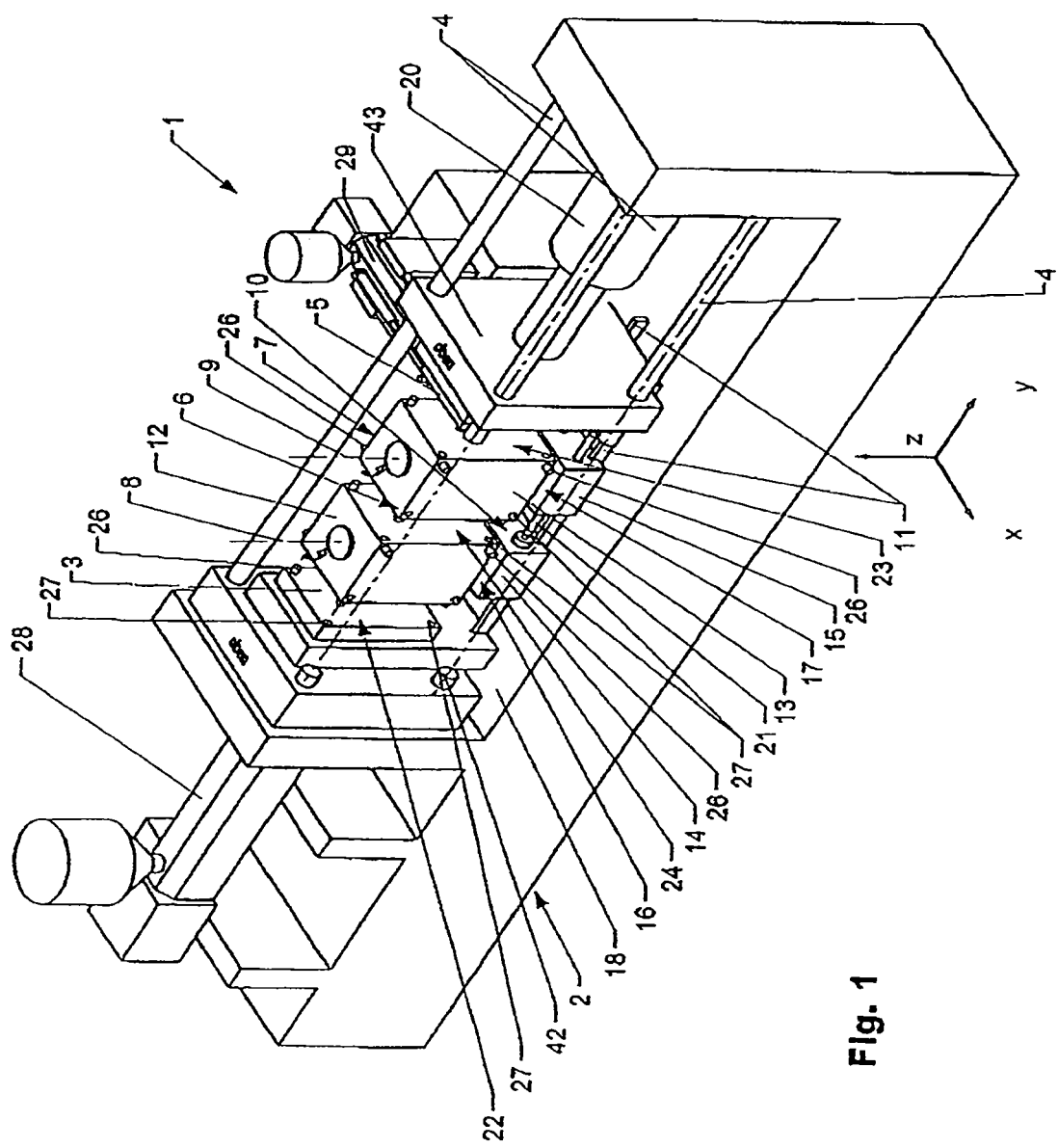
FIG. 1 a first embodiment of an injection moulding device with an injection moulding machine.

FIG. 1 shows a first embodiment of an injection moulding device 1 according to the invention, with an injection moulding machine 2. The injection moulding device 1 contains a first, stationarily arranged mould half 3 and a second mould half 5 displaceably arranged (y-direction) along guide means 4. The first stationary mould half 3 is fastened on a stationary first mould clamping plate 42, and the displaceable, second mould half 5 on a second mould clamping plate 43 displaceable along tie-bars 4, of the injection moulding machine 2.

In the shown embodiment, the tie-bars 4 of the injection moulding machine 2 serve as guide means 4. The tie-bars 4 in the front region are only represented partly (sectioned), so that an improved view of the injection moulding machine 1 is possible. A first and a second, middle part 6, 7 may be recognized between the first and the second mould half 3, 5. The first and the second, middle part 6, 7 in each case have an essentially parallelepiped upper part 12, 13 (mould carrier) with cavity halves (not shown in detail, c£ FIG. 2), which in each case are arranged rotatably driven about a rotation axis 8, 9 which here is arranged vertically (z-direction). The first and the second, middle part 6, 7 are mounted by way of guide means, here in the form of two guide rails 11 arranged parallel to the tie-bars 4 and arranged between these on a machine bed 18 of the injection moulding machine 2. The middle parts 6, 7 in each case comprise a mounting 10 in the form of a base 14, 15 which is movably arranged along the guide rails 11.

Depending on the embodiment, the mould carriers 12, 13 (upper parts) and the bases 14 (lower parts) are releasably connected via standardized interfaces (not shown in more detail) for the transfer of media such as water, air, electricity, hydraulics and electrical and mechanical energy. Commercially available, self-sealing quick couplings are particularly suitable for the transfer of fluid and gaseous media the transfer of electrical energy and digital information is usually effected by way of plug-and-socket connections which are suitable for this.

With the shown embodiment, the exchange of media and of energy is effected between the upper part 12, 13 and the lower part 14, 15 of the middle parts 6, 7, preferably coaxially through the corresponding rotary shaft All media and energy leads (not represented in more detail) are preferably actively connected to the lower part 14.

With the shown embodiment, the upper parts 13 are only held at one side. The bases 14, 15 of the middle parts 6, 7 comprises preferably in each case a rotary unit 16, 17 which serve for rotating the upper part 12, 13 about its respective, here vertical rotary axis 8, 9 (z-direction) with respect to their bast 14, 15. The rotary units 16, 17 are arranged between the bases 14, 15 and the upper parts 12, 13 and comprise coaxial channels and openings which serve for the exchange of media and energy between the lower parts 14, 15 and the upper parts 13. The injection moulding device 1 and the centring means 26, 27 are designed such that they may be opened and closed in 90°- and/or 180°-steps.

The guide rails 11 are a constituent of the injection moulding machine 2, depending on the embodiment, and are preferably fixedly connected to the machine bed 18 of the machine. Alternatively, the guide rails 11 are a constituent of an injection moulding device 1 and are removed out of the injection moulding machine 2 by way of this device, in the case for example of an exchange of the mould. The guide rails 11 or the mounting 10 of the upper parts 12, 13 are preferably designed such that they may be adjusted in angle and alignment, so that a precise alignment with respect to the mould halves 3, 5 and the guide means 4, 11 is possible.

The second, movably arranged mould half 5 is driven via a first hydraulic cylinder 20 which simultaneously serves for producing the closure force of the injection moulding machine 2, acting between the first and the second mould half 3, 5. Alternative embodiments such as toggle lever mechanisms known from the state of the art are possible. A drive of the second mould half 5 which is realized via the tie-bars 4 is possible depending on the embodiment. The two middle parts 6, 7 comprise a drive, shown schematically here as a spindle drive 21. The spindle drive 21 in the shown embodiment acts in the foot region of the middle parts 6, 7, in the vicinity of the guide rails 11, and serves for moving the middle parts 6, 7 or opening and closing the parting planes 22, 23, 24 in coordination for the movement of the second mould half 5. As a rule, the spindle drive 21 is designed such that the middle part 6 is moved essentially with ⅓ and the second, middle part 7 essentially with ⅔ of the speed of the second mould half 5. By way of this, one succeeds in achieving equal distances in the opened condition, between the mould halves 3, 5 and the middle parts 6, 7. Other drive means, e.g. hydraulic cylinders or electric drives are possible, depending on the embodiment. Depending on the embodiment, transmission ratios other than ¼, ¾, ¼ may be preferred, so that the distances between the parts have different measures on opening the mould.

The injection closure device 1 is shown in the opened condition in the shown representation_ The cavities (not shown in detail) which are arranged in a first, a second and a third parting plane 22, 23, 24 are opened in this position. The mould halves 3, 5 and the middle parts 6, 7 are travelled so far apart, that the middle parts may be rotated together or independently of one another about their rotation axes 8, 9.

A first plastification unit 28 which here is arranged on a machine bed 18 behind the first mould half 3 serves for the injection of the plastic molten mass (not shown in more detail) into the cavities arranged in the region of the first parting plane 22, when the injection moulding device 1 is closed. A second plastification unit 29 which here is arranged behind the injection mould device 1 and essentially at a right angle to this, serves for injecting plastic molten mass into cavities which are arranged in the region of the second parting plane 23. The second plastification unit 29 is designed such that only with a closed injection moulding device 1, is it actively connected to this, and does not prevent an opening of this. Alternatively or supplementarily, the possibility exists of providing an injection device which is permanently actively connected to the second mould half and which e.g. is arranged above the first hydraulic cylinder 20.

Centring means, here in the form of centring lugs 26 and centring bores 27 serve for capturing and centring the mould halves 4, 5 and the middle parts 6, 7 after the rotation of the middle parts 6, 7 about their rotation axes 8, 9 by way of the rotation units 16, 17. The centring means prevent the cavities in the parting planes 22, 23, 24 from getting damaged, e.g. as a result of an incorrect position on closing the injection moulding device 1. Depending on the field of application, the centring lugs 26 and/or the centring bores 27 are designed in a full manner or conical in regions, so that an optimal centring is achieved. The centring lugs 26 and the centring bores 27 are arranged alternating in a rotationally symmetrical manner with respect to the rotational axes 8, 9, so that the two mould halves 4, 5 and the two middle parts 6, 7 of the injection moulding device 1 may be closed at all. In contrast to an injection moulding machine with no or only one middle part, the arrangement of the centring means must fulfill a special arrangement. As may be recognized, the centring means 26, 27 here are arranged in the edge region of the mould halves 4, 5 or the middle parts 6, 7. Other arrangements are possible. The centring means 26, 27 if required may be designed such that when the injection moulding device is closed, they serve for the removal of the injection moulding device 1 from the injection moulding machine 2.

Figure 2:
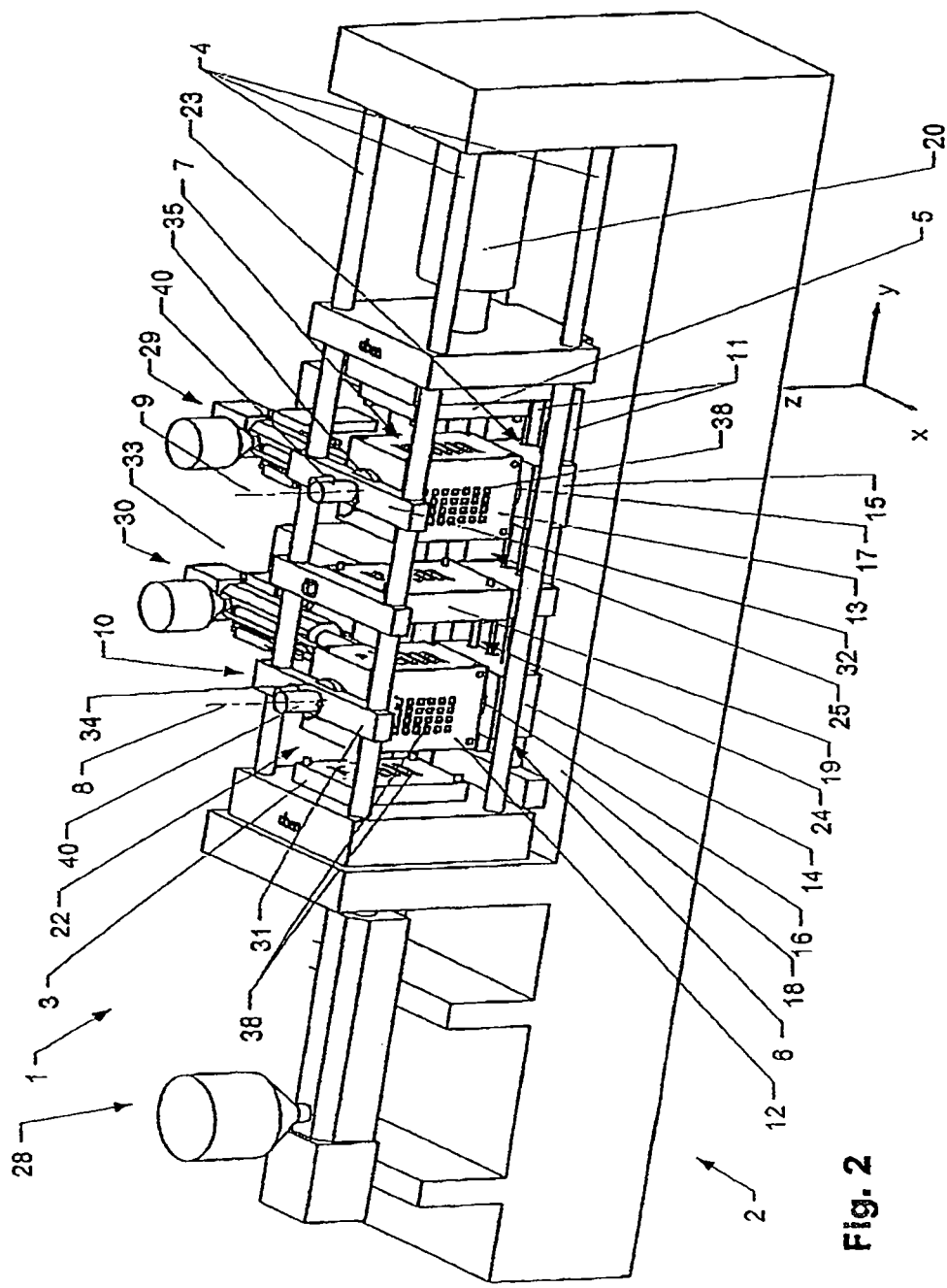
FIG. 2 a second embodiment of an injection moulding device.

FIG. 2 shows a second embodiment of an injection moulding device 1 in a perspective view obliquely from above. The numbering corresponds to that of FIG. 1, so that regions which are not described here are deduced from FIG. 1. The shown injection moulding device 1, between a first stationary mould half 3 and a second mould half 5 which is movable in the direction of tie-bars 4 (y-direction), comprises a third mould half 19 which is movably arranged in the direction of the tie-bars 4, is arranged between the first middle part 6 and the second, middle part 7, and as a rule comprises cavity halves on two oppositely lying sides. The injection moulding device 1 comprises a first, a second, a third and a fourth parting plane 22, 23, 24, 25 between the first mould half 3 and the first middle part 6, the first middle part 6 and the third mould half 19, the third mould half 19 and the second, middle part 7, and the second, middle part 7 and the second mould half 5 respectively. The mould halves 3, 5, 19 and the middle parts 6, 7 in the region of the parting planes 22, 23, 24, 24 respectively comprise cavities 38 into which plastic molten mass is injected by way of a first longitudinally arranged, and a second and third laterally arranged plastification unit 28, 29, 30 when the injection moulding device is closed. The plastification units 28, 29, 30 arc arranged in a stationary manner with the shown embodiment. The second and the third, laterally arranged plastification units 29, 30 arc designed such that they are decoupled on opening the parting planes 22, 23, 24, 25. Another arrangement of the plastification units is possible, depending on the field of application.

The first and the second, middle part 6, 7 are in each case rotatably arranged about a rotation axis 8, 9 which is vertical here. In contrast to the embodiment described in FIG. 1, the middle parts 6, 7 of the embodiment shown here are not only mounted at the bottom in the region of the machine bed 18, but also at the top by way of a first and a second upper crossmember 31, 32. The mounting 10 and the guiding of the upper parts 12, 13 of the middle parts 6, 7 in each case comprises a base 14, 15 supported on the machine bed 18, and in each case an upper crossmember 31, 32. The device is designed such that it may be simply removed from the injection moulding machine.

The third mould half 19 in the lower region is guided on the guide rails 11, and in the upper region by way of a third, upper crossmember 33. The crossmembers 31, 32, 33, are displaceably designed along the tie-bars 4. The drive (not shown in more detail) of the middle parts 6, 7 and the third mould half 19 in the tie-bar direction (y-direction), as a rule is designed such that on opening and closure of the injection moulding machine 1, the first middle part 6 is moved with essentially ¼, the third mould half 19 essentially with ⅔ and the second, middle par 7 essentially with ¾ the speed of the second mould half S, so that the injection moulding device is uniformly opened in the region of the parting planes 22, 23, 24, 25. Other transmission ratios are possible.

The linear drive in the y-direction is effected preferably by way of an active or passive single-sided or two-sided spindle drive, by way of a rack drive or by way of hydraulic cylinders. When required, a rack may be integrated into the rail system. An active drive system is to be understood as a drive which has its own energy supply and permits an automatic movement of the moving parts. A passive drive system is to be understood as a drive which is directly or indirectly actively connected to the hydraulic drive 20 of the injection moulding machine 2. A preferred embodiment of a passive drive comprises coordinating spindles. Preferably one electric or one hydraulic motor which is directly, or via a gear, is indirectly actively connected to the rotation shafts of the middle parts 6, 7 is applied per middle part 6, 7 as a drive 40 for the rotation of the here parallelepiped upper parts 12, 13 of the middle parts 6, 7 about their rotation axes 8, 9.

The two-sided mounting amongst others offers the advantage of a more precise guiding, and of a drive being possible at the bottom as well as at the top, so that the mass forces arc reduced with a larger acceleration. For the removal of the injection moulding device 1 from the injection moulding machine 2, the crossmembers 31, 32, 33 of the shown embodiment arc preferably designed such that the active connection with the tie-bars 4 of the injection moulding machine 2 may be released. The release of the active connection is effected in the region of the rotation units 16, 17 of the middle parts 6, 7 or between the bases 14, 15 (lower parts) and the guide rails 11, depending on the embodiment. It is possible to remove the injection moulding device 1 out of the injection moulding machine from the top and when required to insert it into this again, on account of slim design of the mounting and the simple separation of the active connections. Represented in a simplified manner, the mounting of the middle part in the upper region comprises a crossmember which may be actively connected to the tie-bars 4 of an injection moulding machine 2, and in the lower region comprises a rail system which is mounted on the machine bed 18 of the injection moulding machine 2. With one embodiment, the upper part serves as a mould, mould half or mould carrier. So that the upper part of the middle part is rotatable about a rotation axis, a lower and an upper rotation unit are provided in the region of the lower part and in the region of the upper crossmember, and these units if required, comprise channels in the inside which serve for the coaxial supply of media for the upper part.

The embodiment shown here is particularly suitable for the manufacture of multi-part plastic parts which consist of several plastic components. One manufacturing method may be seen as follows. With a closed injection moulding device 1, plastic parts are formed essentially simultaneously in the region of the four parting planes 22, 23, 24, 25 by way of injecting plastic molten mass into cavities 38. The cavities 38 are subsequently opened by way of moving apart the first, the second and the third mould half 3, 5, 19 and the middle parts 6, 7. The parts formed in the cavities 38 remain sticking to the upper parts 12, 13 of the middle parts 6, 7 and arc led to the next processing step by way of these.

A processing procedure, represented in a simplified mariner, is implemented generally as follows. With a closed injection moulding device, a first plastic component is injected into one or more cavities 38 in the region of the third parting plane 24, so that parts are formed of the first plastic component. Simultaneously, parts of the first plastic component which were previously transported with the first upper part 12 of the first middle part 6 in two 90°-steps in the anticlockwise direction about the rotation axis into the region of the first parting plane 22 are actively connected to a second plastic component in the region of the first parting plane 22. Essentially simultaneously, again parts are formed from the first plastic component in the region of the third parting plane 24. The parts from the first parting plane 22, consisting of the first and the second plastic component, by way of rotating the first upper part 12 by 90° about the first rotation axis 8, are subsequently brought into the free front region (opposite the second and the third plastification unit 29, 39) of the injection moulding device, where they are led to a further processing step. A third plastic component is injected into cavities 38 in the region of the second parting plane 23, so that parts are formed. Essentially simultaneously, parts of this third plastic component, in the region of the fourth parting plane 25, arc actively connected a fourth plastic component, in that this is injected into the cavities which are partly formed by the parts of the third plastic component The parts of the third plastic component, with an opened injection moulding device, are previously brought into the region of the fourth parting plane 25 by way of the second upper part 13. Another sequence of processing steps is also possible, as the case may be.

The plastic parts manufactured in the four parting planes 22, 23, 24, 25 are removed from the injection moulding device 1 and/or are assembled by way of a robot (not shown in more detail), in the front region of the injection moulding device 1, opposite the second and the third plastification units 28, 29. Further processing steps, for example marking the plastic parts or a cooling phase may be provided in the rear region of the injection moulding device 1. If required, the injection moulding machine may comprise more that two middle parts 6, 7 and/or third mould halves 19.

In a further embodiment of the invention, the third mould half 19 as the two middle parts 6, 7 are rotatably arranged about a third rotation axis (not shown in more detail). The third mould half 19 has a suitable mounting for this purpose. This permits the manufacture of very complicated plastic parts in a single injection moulding device. If required, there is the possibility of combining the middle parts with 2, 4 or 6 sides in the same injection moulding device. Further processing steps may for example be realized by robots.

Figure 3:
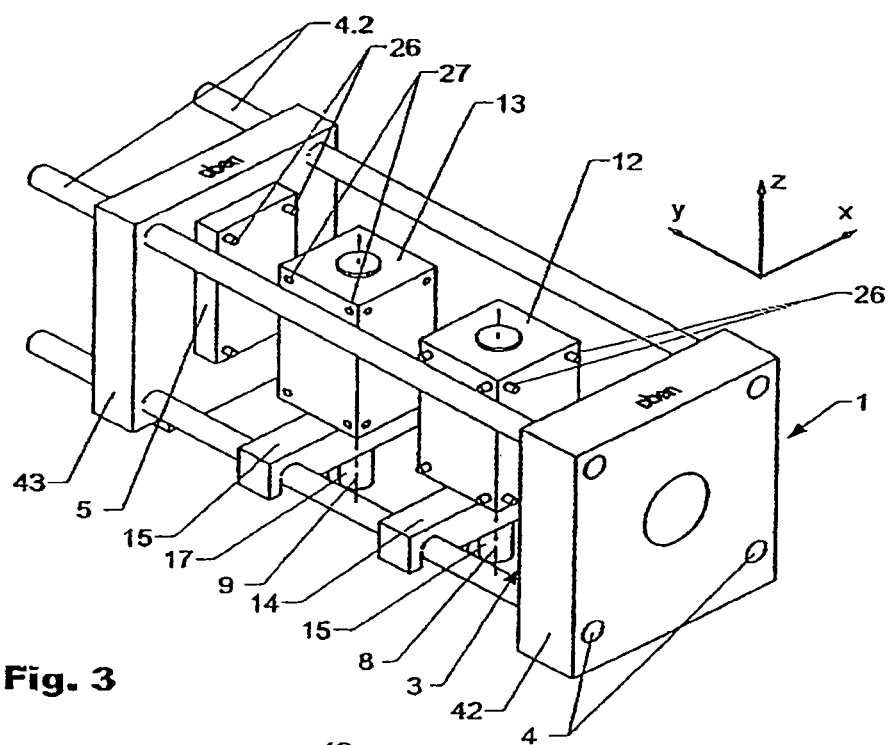
FIG. 3 a third embodiment of an injection moulding device, obliquely form above.

FIG. 3 shows a further embodiment of an injection moulding device 1 in a perspective representation obliquely from above. A stationary first mould half 3 is fastened on a stationary mould clamping plate 42. A second mould half 5 is attached to a second mould clamping plate 43 which is displaceably arranged along tic-bars 4.1, 4.2 of an injection moulding machine (not shown in more detail). A first and second, middle part 6,7 with a mould carrier 12, 13 each rotatable about a rotation axis 8, 9 with respect to a base 14, 15 are arranged between the first and the second mould half 3, 5. The bases with the shown embodiment are designed as crossmembers 14, 15 which in the shown embodiment are actively connected to the lower tie-bars 4.1 of the injection moulding machine. The crossmembers 14, 15 are driven in a displaceable manner along the tie-bars 4. The active connection between the crossmembers 14, 15 and the tie-bars 4.1 may be simply released, so that the injection moulding device 1 may be installed and removed in a simple manner. With a further embodiment, the crossmembers 14, 15 are in active connection with the upper two tie-bars 4.2, and the middle parts 6, 7 are arranged in a suspended manner. This embodiment has the advantage that an exchange of the injection moulding device is possible in a particularly simple manner.

The mould carriers 12, 13 are actively connected to the crossmembers 14, 15 rotatably about the rotation axes 8, 9 by way of rotation units 16, 17. The rotation units 16, 17 are preferably designed such that the mould carriers 12, 13 are rotatable about the rotation axes 8, 9 in an endless manner. The rotation units 16, 17 comprise channels in the inside, which serve for the exchange of operating material and the supply of energy to the mould carriers 12, 13. The rotation units 16, 17 are provided with a drive for the rotational movement of the mould carriers 12, 13 about the rotation axes 8, 9. Preferably electric and hydraulic motors are used for the drive. When required, the crossmembers 14, 15 are supported below the machine bed (cf. FIG. 1), in order to be able to better distribute the weight of the middle parts. Parting locations may be provided between the crossmembers 14, 15 and the mould carriers 12, 13, and permit a parting of the mould carriers 12, 13 from the lower parts 14, 15.

Figure 4:
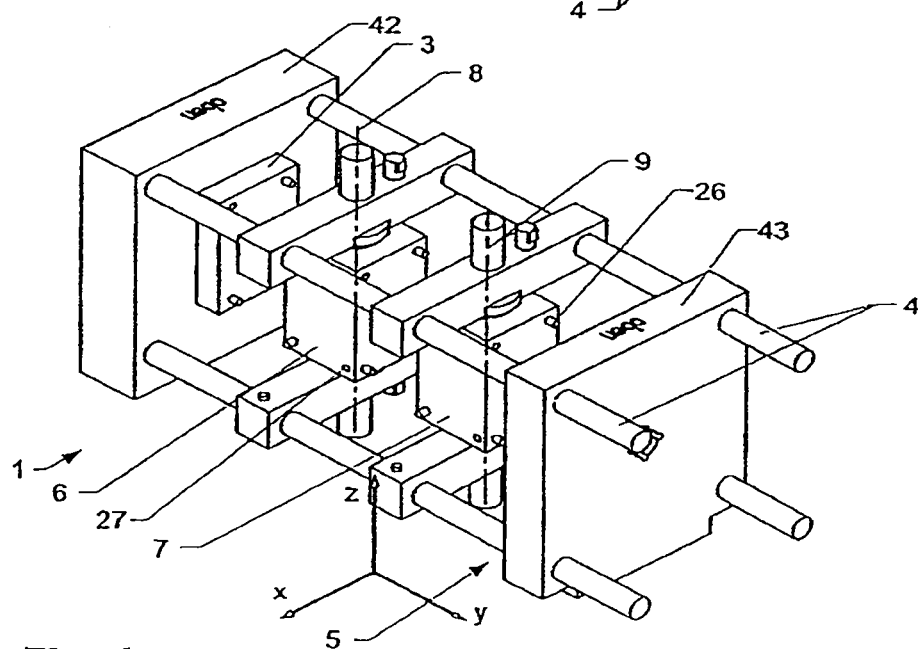
FIG. 4 a fourth embodiment of an injection moulding device, obliquely from above.

FIG. 4 shows a further embodiment of an injection moulding device in a perspective representation obliquely from above. A first and a second mould half 3, 5 as well as a first and a second, middle part 6, 7 rotatable about an axis 8, 9 which is vertical here, are arranged between a first stationary mould clamping plate 42, and a second mould clamping plate 43 which is movable along tie-bars 4. The middle parts 6, 7 here comprise parallelepiped mould carriers 12, 13 which are supported on two sides by way of a lower and an upper crossmember 48, 49 opposite the tie-bars 4 of an injection moulding device which is not represented in more detail. The crossmembers 48, 49 comprise holding means 50 which are releasably actively connected to the mould carriers 12, 13 via interfaces. The holding means 50 may be displaced relative to one another, such that the mould carriers 12, 13 may be removed from the injection moulding machine. The holding means 50 comprise standardized interfaces which serve for the transfer of media to the mould carriers 12, 13. Centring means, here in the shape of centring lugs 26 and centring bores 27 are arranged in a rotationally symmetrical manner, such that they engage into one another in the closure positions of the mould carriers 12, 13 on closure of the injection moulding device 1. The centring means 26, 27 are designed such that they are suitable for the correction of a certain incorrect position of the mould carriers 12, 13 as a result of a rotation about the rotation axes 8, 9 against towards one another, or of the mould halves 3, 5. In contrast to rotary systems known from the state of the art, the exact pre-centring of the rotatable parts with the invention disclosed here is of particular importance, since incorrect positions are considerably more likely due to the many moving parts. For this reason, the centring means as a rule are designed such that they permit a centring of the mould before this is completely closed or the sensitive cavities engage into one another. With a preferred embodiment, the centring means have a length which corresponds to roughly double the diameter of the centring means.

Figure 5:
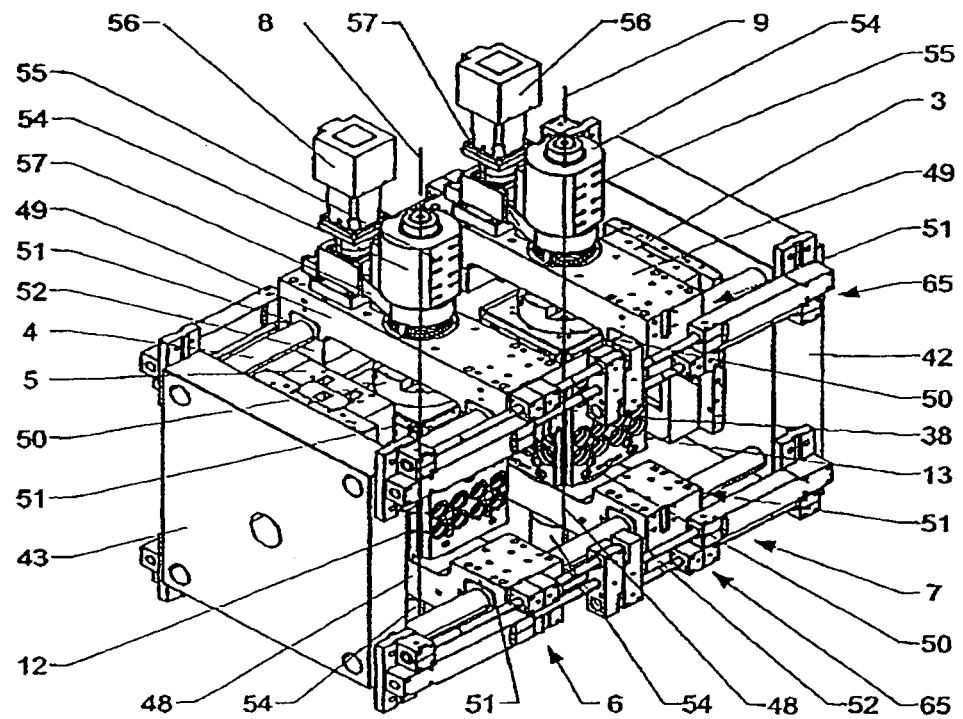
FIG. 5 a fifth embodiment of an injection moulding device, obliquely from above.
Figure 6:
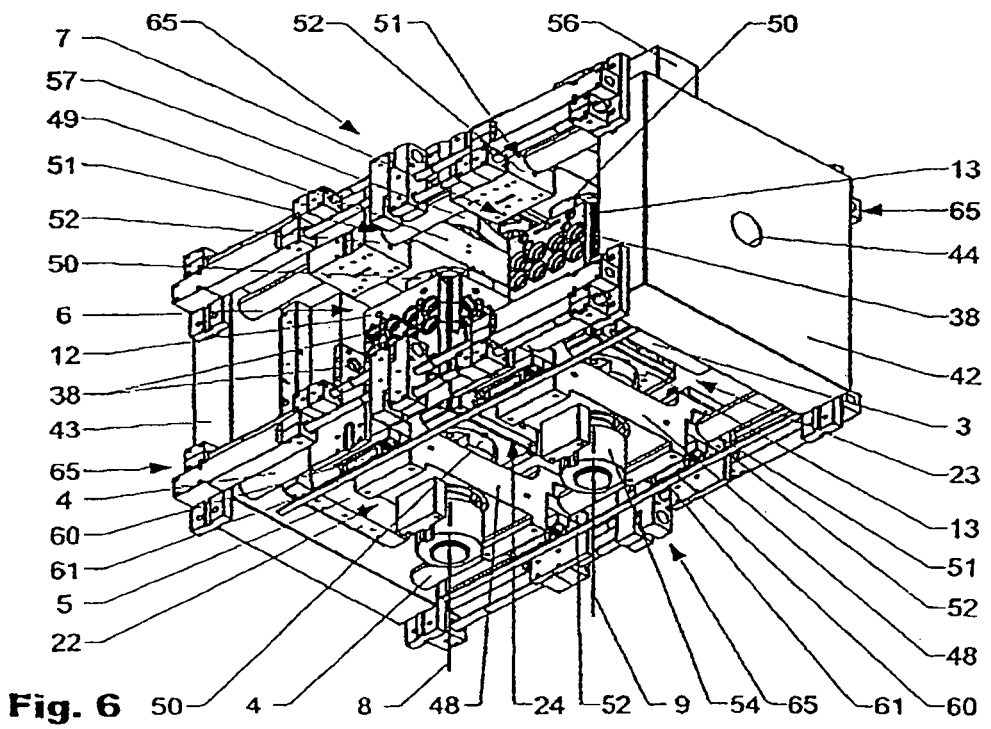
FIG. 6 the embodiment from FIG. 5 obliquely from below.
Figure 7:
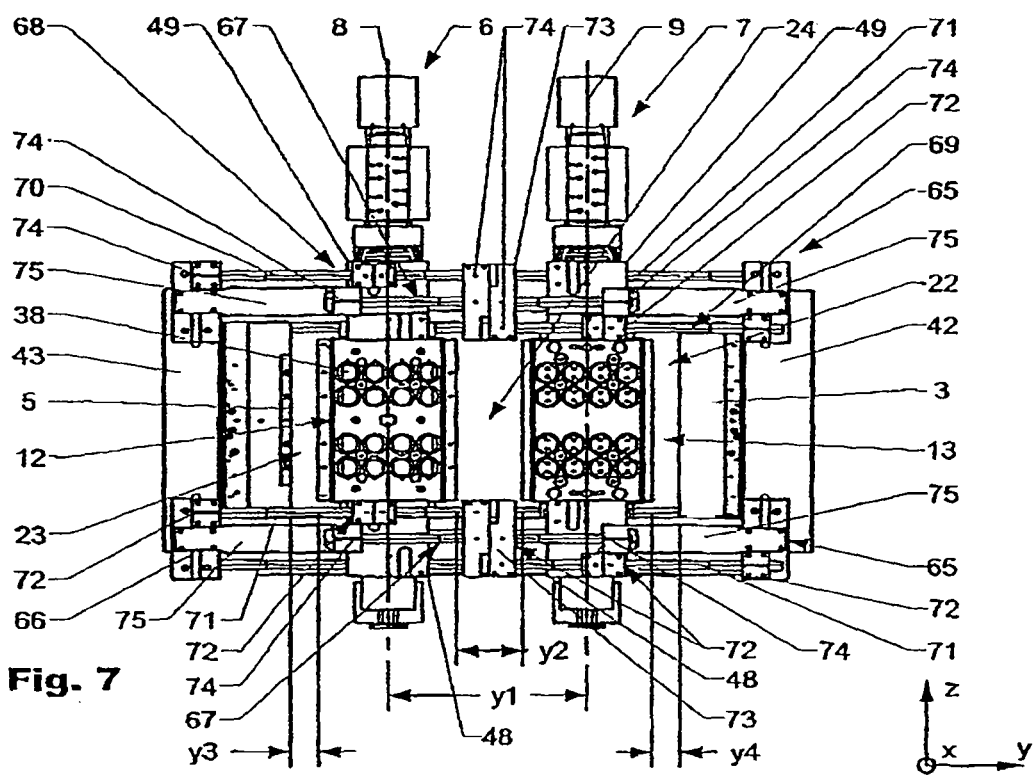
FIG. 7 the embodiment of FIG. 5, from the front.
Figure 8:
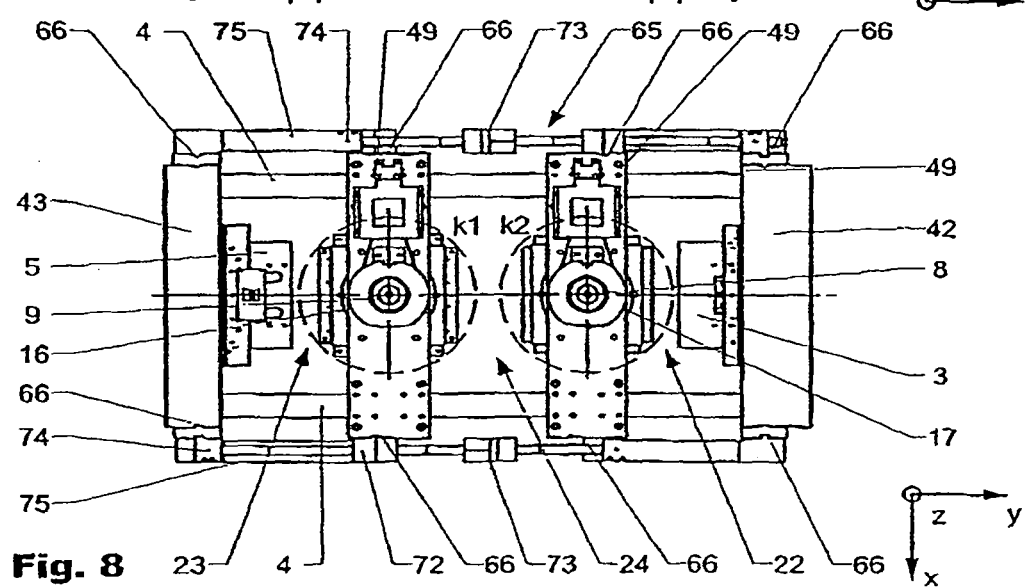
FIG. 8 the embodiment of FIG. 5, from above.

FIG. 5 and FIG. 6 show a further embodiment of an injection moulding machine 1 in a perspective representation obliquely from above/the front, and obliquely from below/the rear. FIGS. 7 and 8 show the same injection moulding device 1 front the front (FIG. 7) and from above (FIG. 8). The numbering in these three Figures corresponds to one another. Not all reference numerals are present simultaneously in all figures. The injection moulding device 1 is shown in the opened position, i.e. with opened parting planes 22, 23, 24.

The injection moulding device 1 is arranged between a first stationary mould clamping plate 42 and a second mould clamping plate 43 which is movable along tie-bars 4 (y-direction), of an injection moulding machine (not shown in more detail). The injection moulding device I comprises a first mould half 3 with cavity halves 38 which is actively connected to the first mould clamping plate 42. A second mould half 5 with cavity halves 38 is actively connected to the movable mould clamping plate 43. A first and a second, middle part 6, 7 are arranged between the first and the second mould halves 3, 5, and are in each case rotatable about a vertical axis 8, 9 (z-direction) which is essentially perpendicular to the tie-bars 4.

Each middle part 6, 7 comprises a lower and an upper crossmember 48, 49 (x-direction) which are mounted on the tie-bars 4 of the injection moulding machine in a longitudinally displaceable manner via bearings 51. In the shown embodiment, the bearings 51 are designed such that they may be separated, so that they may be simply released from the tie-bars of the injection moulding machine for the purpose of the removal of the injection moulding device I from the injection moulding machine by way of removing lower bearing shells. The crossmembers 48, 49 of each middle part 6, 7 in each case comprise one holding means 50 which serves for the mounting of a mould carrier 12, 13 with cavities 38, which is arranged therebetween and here is parallelepiped The holding means of each middle part 6, 7, said holding means being allocated to one another, are mounted aligned to one another and rotatably with respect to the crossmembers 48, 49 about rotation axes 8, 9. The holding means 50 are actively connected to the crossmembers 48, 49 which are allocated to them, by way of bearing units 54 which are rotatable about rotation axes 8, 9. The bearing units 54 preferably comprise pm-stressed bearings which ensure a precise guiding. The holding means 50 are preferably connected to the mould carriers via quick couplings, so that the mould carriers may be installed and removed in a simple manner. With certain embodiments, the holding means 50 are arranged displaceable to one another in the horizontal and/or vertical direction, so that the mould carriers may be installed and removed without removal of at least of one of the crossmembers. The holding means 50 when required are arranged such that they may be individually adjusted in the vertical and/or horizontal direction in a certain range for a fine setting/adjustment.

With the shown embodiment, the bearing units 54 simultaneous serve for the exchange of media with the mould carriers 12, 13. For this purpose, the bearing units 54 comprise connections 55 for media conduits such as water, hydraulic oil, etc. Further interfaces for the exchange of information and electrical energy are him-wise present if required. The exchange of media with the mould carriers 54 as a rule is effected coaxially through inner hollow shafts (may not be recognized) of the bearing units 54 and via the holding means 50. The coaxial transfer of media is preferably effected from the lower side and/or the upper side.

With the shown embodiment, the rotational drive of the mould carriers 12, 13 about the rotation axes 8, 9 is effected from the upper side via the bearing units 54. Each middle part 12, 13 comprises a servomotor 56 which is actively connected to the mould carrier 12, 13 via a toothed belt 57. With certain embodiments, the servomotor is integrated into the bearing units 54. The mould carriers 12, 13 may rotate about the rotation axes 8, 9 in a precise manner by way of the servomotor 56. Due to the coaxial transfer of media, there exists the possibility of infinitely rotating the mould carriers about their rotation axes 8, 9.

With the shown embodiment, the middle parts 6, 7 of the injection moulding device 1 are supported on the machine bed of the injection moulding machine (not shown in detail) between the tie-bars 4 (cf FIG. 6) by way of linear bearings 60. The linear bearings 60 serve for compensating the weight of the middle parts 6, 7 and for the partial load alleviation of the tie-bars 4. They also serve as aids for installment and removal. The linear bearings 60 cooperate with rails 61 which are arranged on the machine bed of the injection moulding machine. If required, the bearings 51 as well as linear bearings 60 may be adjusted in angle, position and alignment with respect to the main movement direction (y-direction), or the direction of the tie-bars 4 of the injection moulding device.

With a closed injection moulding device 1, parts are manufactured by way of injecting plastic into cavities 38 in the region of the first and second parting plane 22, 23. The injection into the cavities 38 in the region of the first parting plane 22 as a rule is effected through an injection opening 44 in the stationary mould clamping plate 42. The injection of plastic into cavities of the second parting plane 23 is preferably effected by an injection apparatus which is arranged laterally next to, or above the injection moulding device I and which is actively connected to the injection moulding device either only temporarily during the injection procedure, or is constantly connected to this and moves with it. The injecting is effected either directly or via the second, moving mould clamping plate 43. Parts (not shown in more detail) manufactured previously in the first and second parting plane 22, 23 are actively connected to one another in the region of the third parting plane 24. The parts for this purpose remain sticking to the cavity halves 38 on the mould carrier side 12, 13 on opening the first and second parting plane 22, 23, and are brought from the first or the second parting plane 22, 23 into the region of the third parting plane 24 by way of rotating the mould carriers 12, 13 respectively. For this, the mould canners 12, 13 as a rule arc rotated by 90° or by i 80° about the rotation axes 8, 9. In the case of 90°-steps, the parts are transported into the region of the third parting plane 24 in two steps, so that they are arranged laterally on the injection moulding device during the intermediate step. In this position, the parts may either cool down or be subjected to a further processing step by way of an external device or one which is integrated into the injection moulding device.

The injection moulding device 1 comprises coordination means 65 which coordinate the movement of the moving parts on opening and closure of the injection moulding device 1. The shown embodiment comprises four coordination means 65, of which in each case two are actively connected to the stationary mould clamping plate 42, the upper two crossmembers and the moving mould clamping plate 43, and in each case two to the stationary mould clamping plate 42, the lower two crossmembers 48 and the moving mould clamping plate 42. The coordination means 65 are designed as modules which are attached at essentially the height of the tic-bars 4 and prevent a lateral tilting of the tie-bars 48, 49 on opening and closing the injection moulding device I. The coordination means 65 are fastened on the mould clamping plates 42, 43 and the crossmembers 48, 49 via releasable connections 66. The coordination between the moving parts of the injection moulding device 1 is lifted by way of removing the coordination means 65, so that the crossmembers 48, 49 arc displaceable along the tie-bars 4 independently of one another e.g. on removal or insertion of the mould halves 3, 5 or of the mould carriers 12, 13.

Each of the four coordination means 65 of the shown embodiment comprises a first, a second and a third spindle 67, 68, 69 which are actively connected to one another. Each of the spindles is divided into two and in the first half comprises a first thread with a positive pitch, and in the second half a second thread 71 with a negative pitch which set opposite to the first. In the middle, the spindles are actively connected via torsion-free axial bearings 72 to a spindle block 73 (first spindle) or to the crossmembers 48, 49 of the first and second, middle part 6, 7 respectively (second and third spindle respectively). The threads of the first spindle 67 are actively connected to corresponding, stationary spindle nuts 74, which are fastened on horizontally arranged carriers 75. The carriers 75 in turn are fixedly connected to the first and the second mould clamping plate 42 respectively. If then, the second mould clamping plate 43 is moved relative to the first mould clamping plate 42, the first spindle 67 begins to rotate on account of the counter running threads on the two sides. Thereby, the rotational speed is dependent on the pitch of the outer thread 70, 71 or the inner thread of the spindle nuts 74. With the shown embodiment, the two threads 70, 71 have the same counter running thread pitch, so that a uniform screwing of the first spindle 67 into the spindle nut 74 results. Due to this, the spindle block is always located in the middle (with respect to the travelled path) between the fast and second mould half 3, 5 on respectively opening and closing the injection moulding machine 1. With the shown embodiment, the middle block moves with half the speed with respect to the relative speed between the stationary first mould clamping plate 42 and the moving second mould clamping plate 43.

The second spindle 68 which is arranged between the first mould clamping plate 42 and the spindle block 73 or the third spindle 69 arranged between the spindle block 73 and the second mould clamping plate 43 have essentially the same construction as the first spindle 67. The second or the third spindle 68, 69 are actively connected to the crossmembers 48, 49 respectively in the region of their middle by way of an axial bearings 72. The relative speed of the crossmembers of the first middle part 6 is therefore determined by the relative speed between the stationary, first mould clamping plate 42 and the spindle block 73, and the speed of the crossmembers 48, 49 of the second, middle part 7 by the relative speed between the spindle block 73 and the second mould clamping plate 43. By way of the described coordination mechanism 65, one succeeds in moving the first middle part 6 on opening and closing the injection moulding device 1 with a quarter, and the second, middle part 7 with three quarters of the speed of the second mould clamping plate 43, so that the distance y2 between the two middle parts 6, 7 or the two mould carvers 12, 13 in the region of the third parting plane 24 is essentially twice as large as the distances y3 and y4 between the first mould half 3 and the first mould carrier 12, and the second mould carrier 13 and the second mould half 5 respectively, in the region of the first and second parting plane 22, 23 respectively. By way of this movement of the middle parts 6, 7 with respect to the mould clamping plates 42, 43, one succeeds in being able to move the mould carriers 12, 13 much earlier about the rotation axes 8, 9 without them colliding with one another, than if the injection moulding device 1 were uniformly opened so that the distances y2, y3, y4 were equally large.

By way of the selection of the pitches of the spindles 67, 68, 69, there exists the possibility of being able to set the distance y1 between the rotation axes 8, 9 or the distances y2, y3, y4 in a largely free manner. By way of the selection of different pitches of the two allocated threads of a spindle, one may influence the ratio such that, e.g. the part which is co-guided in the region of the spindle middle, is co-moved with a defined speed with respect to the second mould clamping plate 43. The described coordination means 65 may be used in a suitable manner also with injection moulding devices 1 with which the middle parts 6, 7 have a different mounting/support with respect to the tic-bars. The middle block 73 many be used for guiding a third mould half as is shown in FIG. 2.

On removal of the described injection moulding device 1 from a standardized injection moulding machine 1, the four coordination means 65 are removed, so that the middle parts are freely movable relative to one another. With an opened injection moulding device, the bearing shells 52 of the bearings 51 of the upper crossmembers 49 are released. After the release of the lower holding means 50 and all media supply conduits and cable connections, the mould carriers 12, 13 may be removed together with the upper crossmembers 49. Depending on the embodiment, firstly only the upper holding means 50 are released, and firstly only the upper crossmembers 49 and only then the mould carriers 12, 13. The bearings 50 of the lower crossmembers may then be subsequently opened and the lower crossmembers 48 removed. Preferably the travelled paths of the moved parts are matched to one another depending on the parting plane by way of a coordination mechanism, such that the middle parts may be rotated efficiently and when required, simultaneously (cf. FIG. 8, here schematically indicated by circles k1 and k2 on which the outer points of the mould carriers 12, 13 rotate).

The parts from the first and the second parting plane 22, 23 are actively connected to one another in the region of the third parting plane 24. In a preferred embodiment, this is effected by way of peripheral injection with a material component, which for example is injected laterally or from above into further cavities (not shown in more detail). In a preferred embodiment, these further cavities result either on account of a cooperation of the cavities 38 of the first and of the second mould carrier 12, 13 or alternatively or supplementarily by way of displacing a part of the injection mould e.g. of a slide (not shown in detail), in a mould carrier 12, 13. The injecting into the further cavities is preferably effected by way of a separate injection assembly of the described form.

Alternatively or supplementarily the parts of the first and of the second parting plane 22, 23 are mechanically joined together or actively connected in a direct or indirect manner in the region of the third parting plane 24. In a first embodiment, this is effected by way of the closure movement of the injection moulding device 1, which however under certain circumstances entails the disadvantage that the injection moulding device may not be closed with the maximal possible speed, or there exists the danger that the parts and/or the injection mould are damaged. A further problem lies in the fact that the relative movement in this variant is very difficult to control and adjust due to the high mass of the moved parts. In a further embodiment of the invention, a separate active connection device is present, which is suitable for joining the parts together. In a preferred embodiment, at least one of the mould carriers 12, 13 is provided with a separate active connection device which is capable of functioning decoupled from the closure movement of the injection moulding device 1. The active connection device as a rule is at least partly arranged in the inside, and is in active connection with parts which are arranged in the cavity halves 38 of the first and/or the second mould carrier 12, 13. When required, the active connection device has a construction which permits an adjustment of the force and/or path per cavity or group of cavities. The active connection device is designed such that the parts of the corresponding cavities 38 which are to be connected to one another are capable of being joined together—with a closed injection moulding device 1. The active connection device is preferably hydraulically, mechanically, and/or electrically driven and may in regions be designed as part of a cavity. In one embodiment, the active connection device is designed as an active connection slide which is designed as one or more parts. When required, each cavity 38 may be designed with a separate active connection device. The active connection device may be designed such that it is only applied with a closed injection moulding device. Alternatively or supplementarily, the active connection device may be designed such that a superposition or utilization of the closure movement of the injection moulding device 1 is used for the joining of the parts to be connected.

Depending on the field of application, the parts to be connected are joined together by way of the active connection device in one step or in several individual steps. For example, there exists the possibility of bringing at least the parts of one side into a certain position or releasing them, before the actual active connection procedure is effected. If required, the parts may be subjected to a further processing step, e.g. in that they are at least partly peripherally injected or welded, after the active connection device has stepped into action.

One of the advantages of a separate active connection device lies in the fact that the parts to be connected to one another arc processed in very much more precise and gentle manner. In particular, a joining together only by way of the closure movement of the injection moulding device is mostly inadequate, in particular with injection moulding devices which comprise a multitude of cavities in a parting plane.

Figure 9:
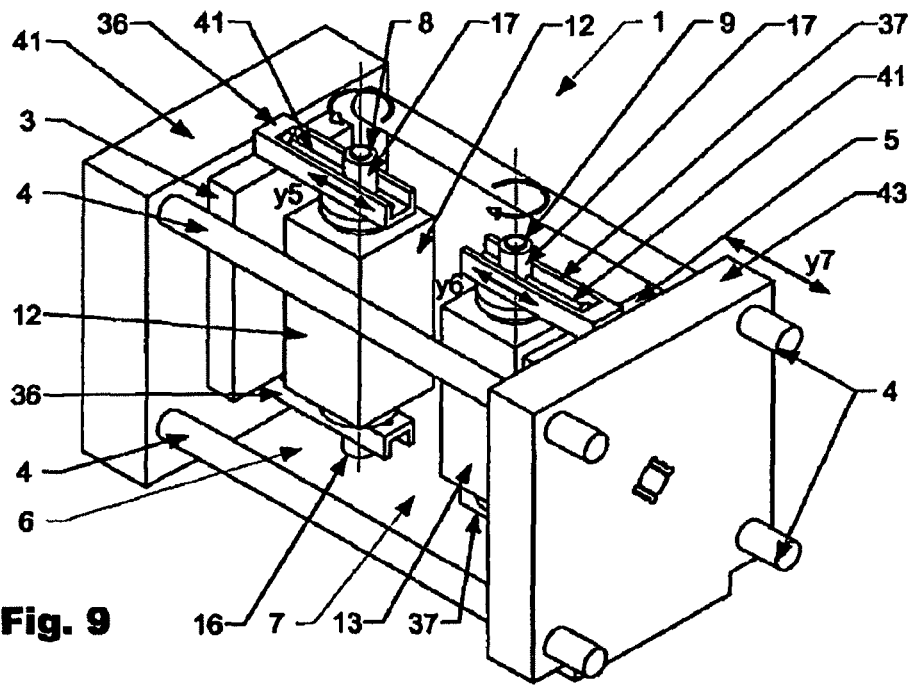
FIG. 9 shows a sixth embodiment of an injection moulding device.

FIG. 9 shows a further embodiment of an injection moulding device 1 in a perspective representation obliquely from above. A stationary first mould half 3 is fastened on a stationary mould clamping plate 42. A second mould half 5 is attached on a second mould clamping plate 43 which is displaceably arranged along tie-bars 4 of an injection moulding machine (not shown in more detail). A first and a second, middle part 6, 7 with in each case a mould carrier 12, 13 rotatable about a first or second rotation axis 8, 9 are arranged between the first and the second mould half 3, 5.

The first and the second, middle part 6, 7 here are each mounted with respect to the mould halves 2, 3 or the mould clamping plates 42, 43 by way of a lower and an upper cantilever arm 36, 37. The cantilever arms 36, 37 serve as a base and as a linear guide. The cantilever arms 36 of the first middle part 6 are arranged in a stationary manner with the first mould half 2. In contrasts to this, the cantilever arms 37 which serve for mounting the second, middle part 3, are actively connected to the second mould half 5 or the second mould clamping plate 43 and moved with these.

The mould carriers 12, 13 arc actively connected to the cantilever arms 36, 37 in a rotatable manner about the rotation axes 8, 9 by way of rotation units 16, 17. The rotation units 16, 17 are preferably designed such that the mould carriers 12, 13 are endlessly rotatable about rotation axes 8, 9, and in the inside comprise channels which serve for the exchange of operating material and the supply of energy to the mould carriers 12, 13. The rotation units 16, 17 arc provided with a drive for the rotation movement of the mould carriers 12, 13 about the rotation axes 8, 9. Preferably electric or hydraulic motors arc used as a drive. The cantilever arms arc preferably designed such that the middle parts may be moved independently of one another with respect to the first or the second mould half.

With the shown embodiment, the middle parts 2, 3 are displaceably arranged in the longitudinal direction with respect to the cantilever aims 36, 37 (schematically represented by arrows y5, y7). Thereby, they are displaced and positioned along the cantilever arms 36, 37 by way of linear drives 41. The movement during the production is matched to the movement (arrow y7) of the second mould halt such that no cycle time is lost and an as time-saving as possible rotation of the middle parts is possible. The parting planes are preferably opened in a non-uniform manner for the purpose of an efficient rotation of the mould carrier 12, 13 about the rotation axes 8, 9. When required, the weight of the middle parts may be compensated by way of additional supporting, e.g. on the machine bed of the injection moulding machine (not shown in more detail), or via the tie-bars 4. The centring and alignment of the individual parts is effected in the described manner. Spindles, toothed belts, racks or hydraulic cylinders are conceivable as linear drives. Passive solutions may comprise a mechanical coupling with the movable mould half 3. The cantilever arms as designed as linear guides or are actively connected to such.

The mould carriers 12, 13 in the region of their side surfaces comprise corresponding cavities (not shown in more detail) into which plastic is injected given a closed injection moulding device 1. The mould carriers 12, 13 are provided with active connection means which given a closed injection moulding device serve for the assembly of injection moulded parts in the middle closure plane. An active connection means is allocated to one or more cavities and may be individually activated when required. The shown embodiment amongst others is suitable for smaller devices.

Figure 10:
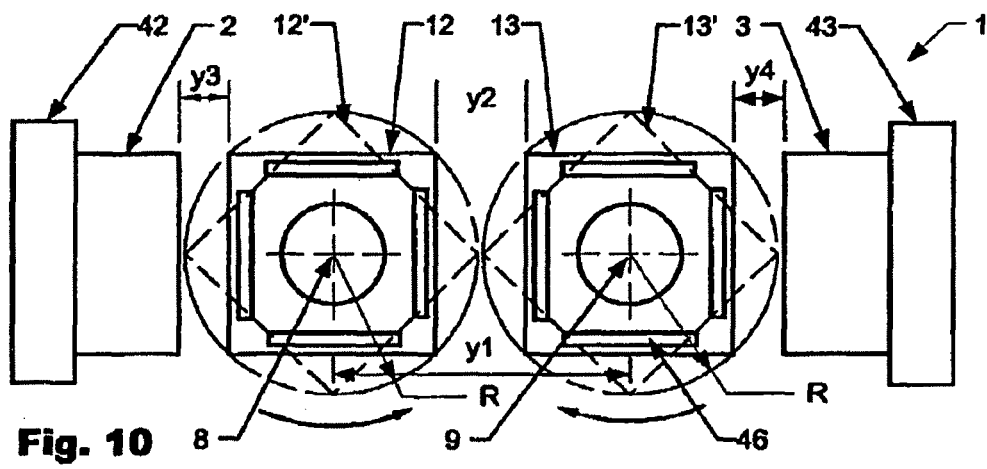
FIG. 10 shows an opened injection moulding device from above.
Figure 11:
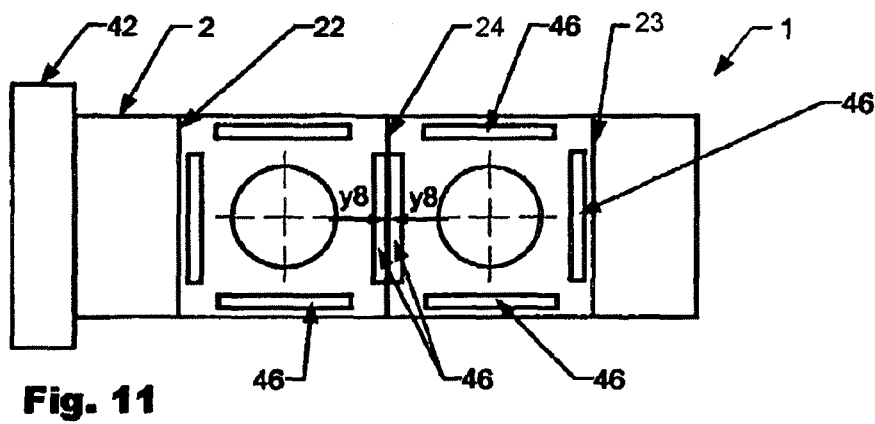
FIG. 11 shows the injection moulding device of FIG. 10 closed.

FIGS. 10 and 11 schematically show an injection moulding device I in the opened (FIG. 10) and in the closed position (FIG. 11). Shown are the stationary and moving mould clamping plate 42, 43 of an injection moulding machine (may not be recognized in more detail) on which a stationary first and a moving second mould half 2, 3 are attached. A first and a second mould carrier may be recognized between the first and the second mould half 2, 3, and are rotatably arranged about rotation axes 8, 9, which here are perpendicular to the plane of the drawing.

In FIG. 10 it is shown in which position the mould halves 2, 3 arc preferably rotated about the rotation axes 8, 9. The distances y1 y2, y3 and y4 are given by the rotational radii R which indicates the outermost point of the mould carrier 12, 13. The diagonal position in which the mould carriers 12, 13 assume the maximal extension is indicated by squares 12', 13'. With the shown embodiment, the rotation is effected most efficiently if the distances y3 and y4 are selected roughly half as large as the distance y2 and the distances y3 and y4 such that the rotation radii do not contact the first and the second mould half 2, 3 respectively.

Active connection means 46 are represented in the FIGS. 10 and 11, which given a closed injection moulding device 1, serve for the assembly of parts in the region of the middle (second) parting plane 23. Further plastic parts are manufactured essentially simultaneously in the first and the second parting plane 22, 24.

In the shown embodiment, both mould carriers 12, 13 comprise active connection means 46 which serve for the simultaneous joining of parts of two cavities allocated to one another. Depending on the field of application, there exits the possibility of providing only one mould carrier 12, 13 or both in an alternating manner, with active connection means 46, so that the joining of parts is effected in only one direction in the middle parting plane 23. When required one may also provide several active connection means which execute a multi-stage processing in a sequential or superimposed manner. If required, processing steps and/or manipulations are possible with an opened device. The active connection means 46 of the middle parting plane are shown travelled together (cf arrow y8) in FIG. 11, which is to represent an active connection process in a simple manner. One of the advantages of the shown device is the fact that the active connection of parts may be decoupled by the main machine movement of the injection moulding machine.

With regard to the active connection means it is preferably the case of individual or several, individually or commonly actuatable slides, rakes or displacement means or a combination of these which are applied simultaneously or sequentially. The active connection means are moved or rotated parallel or perpendicularly to the main movement direction of the injection moulding machine according to function. Other movement forms are possible. The active connection means are preferably driven via hydraulics or electric motors, or by way of a mechanical coupling to other parts of the device. Complex movements may be realized e.g. by way of involutes. If required, the movements and the forces may be monitored by way of sensors per cavity or a group of cavities. When required, the active connection means serve for ejecting the finished parts with an opened injection moulding machine.

Further embodiments may be deduced by the man skilled in the art by way of combination of the features of the described devices.

What is claimed is:

1. A method of manufacturing a multi-part product in an injection molding device, the method comprising:
   a) closing the injection molding device;
   b) injecting liquid plastic into cavities of the closed injection molding device to essentially simultaneously manufacture a first part and a second part of a multi-part product in a first and a second outer parting plane of the closed injection molding device,
   c) while the injection molding device is still closed, assembling the multi-part product in a region of a third, middle parting plane by actuating active connection means configured to actively connect by way of relative movement a first formerly manufactured part and a second formerly manufactured part;
   d) opening the injection molding device along the parting planes and
   e) rotating the first manufactured part and the second manufactured part about an angle out of the first and second outer plane respectively towards the third, middle parting plane.

2. The method of claim 1, further comprising repeating the steps a to e.

3. The method of claim 1, wherein the third, middle parting plane is roughly twice as wide as the first and the second parting plane.

4. The method of claim 1, wherein active connection of the first manufactured part and the second manufactured part in the third, middle parting plane is effected independently of the movement of mold clamping plates of the injection molding machine.

5. The method of claim 1, wherein active connection of the first manufactured part and the second manufactured part in the third, middle parting plane is effected independently in groups of cavities allocated to one another.

6. The method of claim 1, wherein the parts are ejected by way of active connection means configured to actively connect the first formerly manufactured part and the second formerly manufactured part by way of relative movement.

* * * * *